(12) United States Patent
Ferguson

(10) Patent No.: US 7,887,068 B2
(45) Date of Patent: Feb. 15, 2011

(54) MUTUALLY NESTABLE SHOPPING CARTS HAVING BAG HANGERS

(76) Inventor: Jeremy Ferguson, 5989 SE. Dewey, Milwaukie, OR (US) 97222

( * ) Notice: Subject to any disclaimer, the term of this patent is extended or adjusted under 35 U.S.C. 154(b) by 617 days.

(21) Appl. No.: 11/974,745

(22) Filed: Oct. 15, 2007

(65) Prior Publication Data

US 2008/0088101 A1    Apr. 17, 2008

Related U.S. Application Data

(60) Provisional application No. 60/852,247, filed on Oct. 17, 2006.

(51) Int. Cl.
*B62D 39/00* (2006.01)
(52) U.S. Cl. ............... 280/33.992; 280/33.995
(58) Field of Classification Search ............ 280/33.991, 280/33.992, 33.997, 33.995; 248/100
See application file for complete search history.

(56) References Cited

U.S. PATENT DOCUMENTS

| | | | | |
|---|---|---|---|---|
| 3,702,018 A | * | 11/1972 | Wood | 280/47.34 |
| 3,909,034 A | * | 9/1975 | Trubiano | 280/47.34 |
| 4,560,096 A | * | 12/1985 | Lucas et al. | 224/411 |
| 4,576,388 A | * | 3/1986 | Pope | 280/33.995 |
| 4,871,100 A | * | 10/1989 | Posner | 224/411 |
| 4,974,799 A | * | 12/1990 | Palmer | 248/95 |
| 5,009,516 A | * | 4/1991 | Geeck | 383/37 |
| 5,265,893 A | * | 11/1993 | Ettlin | 280/33.992 |
| 5,836,596 A | * | 11/1998 | Wanzl | 280/33.991 |
| 6,966,565 B1 | * | 11/2005 | Ryan et al. | 280/33.992 |
| 7,017,920 B2 | * | 3/2006 | Fraser | 280/33.992 |
| 7,396,025 B2 | * | 7/2008 | Ondrasik | 280/33.991 |
| 7,398,976 B2 | * | 7/2008 | Splain et al. | 280/33.992 |
| D608,518 S | * | 1/2010 | Luebke | D34/21 |

* cited by examiner

*Primary Examiner*—J. Allen Shriver, II
*Assistant Examiner*—Bridget Avery
(74) *Attorney, Agent, or Firm*—Timothy E. Siegel Patent Law, PLLC

(57) ABSTRACT

A shopping cart having knobs, ridges or other protrusions upon which plastic store bags can be hung by their handles. It may also be thought of as the method of providing such a cart to a shopper or shoppers, and may include the further step, performed by a shopper, of hanging store bags from the protrusions. The invention may also encompass a shopping cart having bag hangers that are positioned and adapted to retain a tray, and the method of positioning a tray on a shopping cart.

8 Claims, 4 Drawing Sheets

MUTUALLY NESTABLE SHOPPING CARTS HAVING BAG HANGERS

CROSS-REFERENCE TO RELATED APPLICATION

This application claims the benefit of U.S. Provisional Application No. 60/852,247, filed Oct. 17, 2006.

BACKGROUND

The loading of a shopping cart with bags of groceries presents the danger of delicate groceries being crushed. Although skillful cart loaders are careful to put the hard, heavy objects, such as food cans, in first, there is always the danger that during cart movement the cart contents will rearrange themselves, resulting for example in a loaf of bread being crushed between two bags of food cans. Another danger is that of having bag contents spill out onto the bottom of the cart. This is a particular problem with the plastic store bags of today, with their very flexible sides. Not only must the contents be re-bagged prior to loading the bags into a car, but the loose groceries make it more difficult to find a spot for placing subsequent bags on the cart bottom surface.

Moreover, for some shoppers, the amount they purchase per shopping trip is limited to how much can be loaded into a standard-size shopping cart. Finding some way of loading more onto a standard-size shopping cart would increase the purchases such a shopper would make on a shopping trip, thereby benefiting the store merchant who made this possible.

Another purpose towards which shopping carts are employed is to provide a mobile working station for store employees evaluating inventory, or performing other related tasks. Store employees sometimes rest a tray on top of a shopping cart, in order to provide a working surface for themselves. This is an imperfect solution, however, as the tray may not be affirmatively retained on the cart top, and may threaten to tilt off at any moment.

SUMMARY OF THE INVENTION

The present invention may take the form of a shopping cart having knobs, ridges or other protrusions upon which plastic store bags can be hung by their handles. It may also be thought of as the method of providing such a cart to a shopper or shoppers, and may include the further step, performed by a shopper, of hanging store bags from the protrusions. The invention may also encompass a shopping cart having bag hangers that are positioned and adapted to retain a tray, and the method of positioning a tray or "cargo net" on a shopping cart.

Other features of the present invention will be apparent from the accompanying drawings and from the detailed description that follows.

BRIEF DESCRIPTION OF THE DRAWINGS

Exemplary embodiments are illustrated in the drawings. It is intended that the embodiments and figures disclosed herein are to be considered illustrative rather than restrictive.

DETAILED DESCRIPTION OF THE PREFERRED EMBODIMENTS

Figure 1:
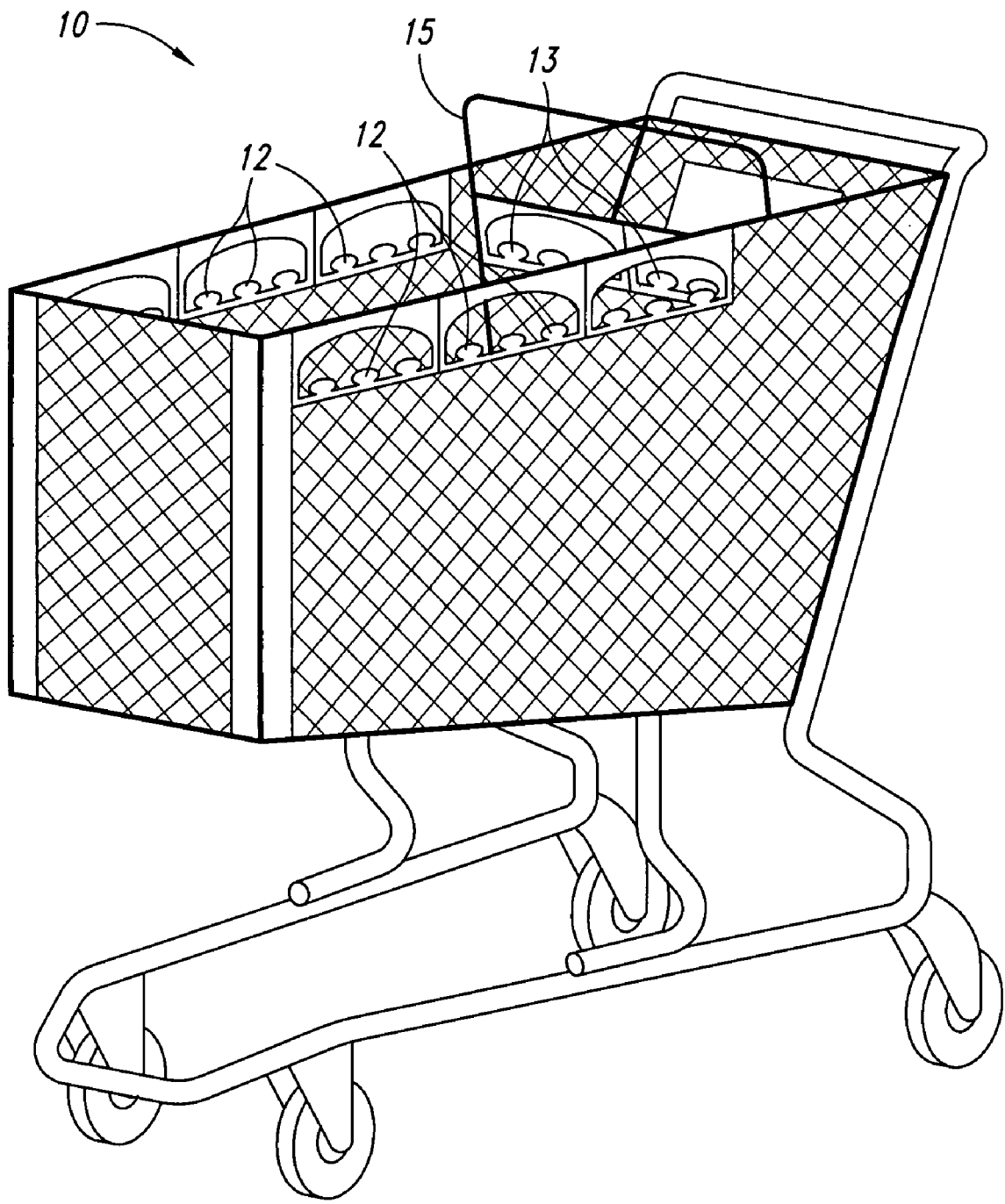
FIG. 1 is a perspective view of a preferred embodiment of a shopping cart according to the present invention, having three bag hangers per bag hanger unit.

One preferred embodiment of the present invention is a shopping cart 10 that defines a set of bag hangers 12 that are coincident with the basket walls of the cart. Referring to FIG. 1, this embodiment is particularly easy to realize in a cart that has molded plastic walls, as the molds may simply be formed to create a set of upwardly projecting bag hangers 12, which are fixed in place. The bulbous nature of the bag hangers 12, created by the slight lateral indents 14 near the base, provides a place for the store bag handles to settle, thereby being more positively retained. Moreover, because the bag hangers 12 are coincident with the side walls of the basket portion of the shopping cart, they do not interfere with the horizontal nesting of carts. Cart nesting is necessary to facilitate cart storage, typically near the entrance of a store. Additionally, it may be noted that cart 10 has three bag hangers per lateral unit.

As part of the rear side wall many shopping cart include a gate 15. This is a side wall portion that defines a support for the back of an infant or toddler. The gate 15 may be equipped with bag hangers 13, to facilitate the storage of bags of groceries. Bag hangers 13 could be added as a retrofit, by replacing gate 15 with a gate that includes bag hangers. Because gate 15 is pushed up out of the way when carts are nested it is easier to retrofit gate 15, and it is also possible to retrofit by adding hangers 13 to a gate 15.

Skilled persons will readily recognize that a similar embodiment could be created in a metal cart. In this embodiment, the metal bars from which the cart is formed are bent to create a bulbous bag hanger, similar in form to a bulbous hanger 12.

Figure 2:
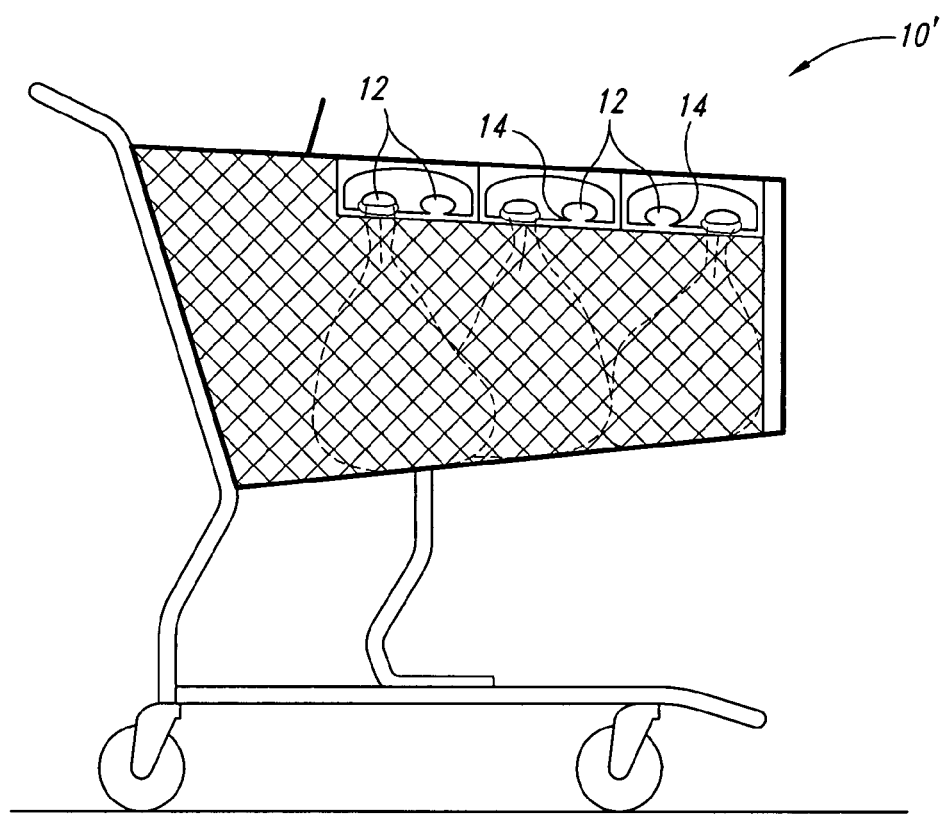
FIG. 2 is a side view of an alternative preferred embodiment of a shopping cart according to the present invention, having two bag hangers per bag hanger unit, and showing grocery bags hanging from the bag hangers.
Figure 3:
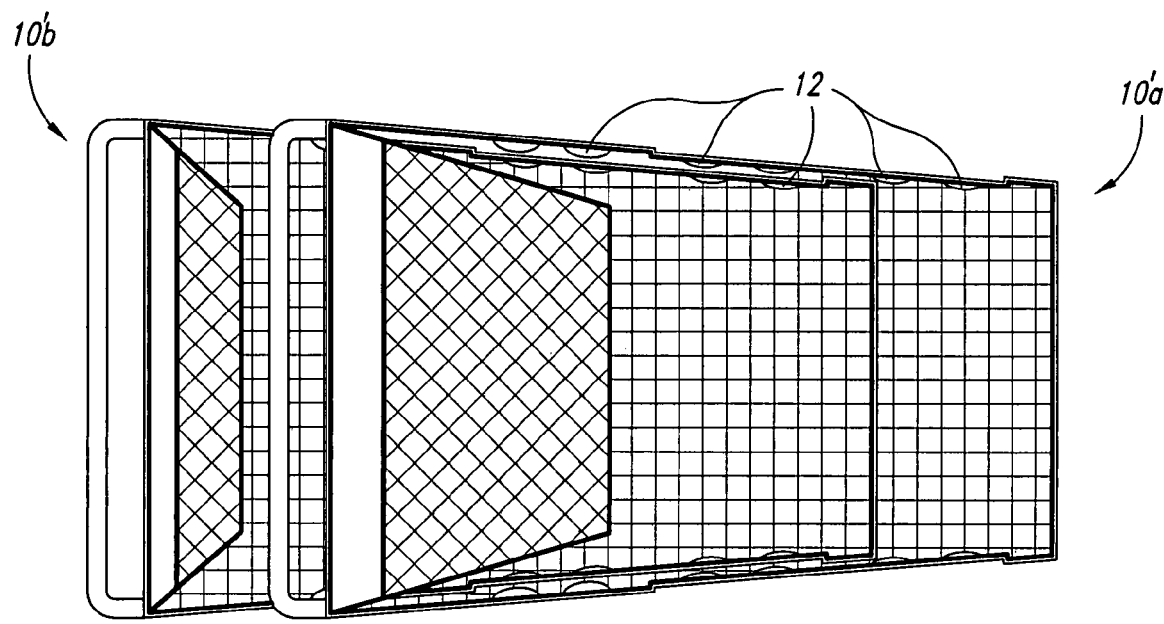
FIG. 3 is a top view of two shopping carts, according to the embodiment of FIG. 2, being nested together.

As shown in FIGS. 2 and 3, in an alternative embodiment, a shopping cart 10' has two bag hangers per unit. Also, as shown in FIG. 3, these bag hangers protrude inwardly into the cart, but in so doing create an indent in the side wall's exterior into which the hangers of another cart could protrude, in order for the carts, 10'*a* and 10'*b,* to nest. Also, bag hangers 12 could be shrunken and rotated so that they are bulbous in a manner perpendicular to the plane of the side wall on which they are mounted. It will also be evident that other shapes are possible for ridges 12, for example a T-shape or upside-down L-shape. In one preferred embodiment the arms of the T-shapes (or single arm of the L-shape) extend slightly downwardly, towards their ends, to more positively retain the store bag handles. It should also be noted that although the version of cart 10 shown include bag hangers 12 disposed underneath the top of the cart side walls, in another preferred embodiment bag hangers 12 protrude upwardly from the top of the cart side wall.

The arrangements described above yield many advantages. Some groceries, for example bags of fruit, tend to spread out on the bottom of a shopping cart, leaving little free surface area for packing other items. Hanging a store bag holding this type of content will tend to preserve more shopping cart bottom surface area for packing additional store items.

Also, bag hangers 12 provide an additional option for handling bags with heavy items, such as cans. Typically, these are put on the bottom of the cart where they are less likely to crush the more delicate items. If a shopper has, however, arranged his items on the check-out counter belt with the heaviest items in the back, it is possible that by the time the heavier items are bagged and ready to be placed in the cart, all of the bottom surface area is already taken. This typically causes a rearrangement of the groceries in the cart, with precious seconds wasted. Bag hangers 12 permit the heavy, rigid items to be safely suspended above the items that they would crush if they were laid directly over and supported by these delicate items.

It is also possible to load more groceries by arranging bags so that they hang on the outside of the shopping cart. This may be particularly beneficial for shoppers who have large families or live far away from the closest store, and accordingly purchase a large supply of groceries on their visit to the store. The limiting factor for customers of this type may be the quantity of groceries they are able to load into the shopping cart. Being able to suspend store bags from the outside of the cart could help customers of this type, and also help the store sell more to them.

Looking forward, the present invention dovetails well with the upcoming introduction of radio frequency identification (RFID) into stores. With the advent of RFID the step of item bagging by store employees may be rendered obsolete by the elimination of the need for a cashier to check out purchased items. In the future, with each item bearing its own RFID tag, a customer's order will be tallied by simply wheeling the cart past the RFID reader. Accordingly, customers will be encouraged to bag their own items at the time of selection. Having handy bag hangers 12 will ease the task of filling and storing the bags in the cart, for the store customers of the future.

Figure 4:
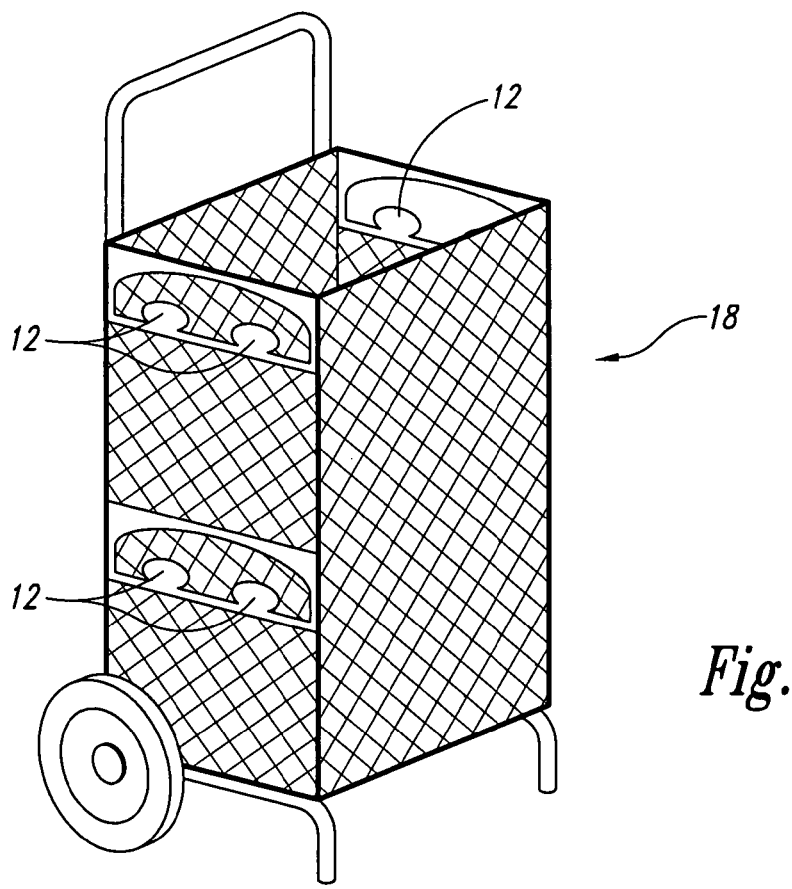
FIG. 4 is a perspective view of a personal shopping cart having a set of bag hangers.
Figure 5:
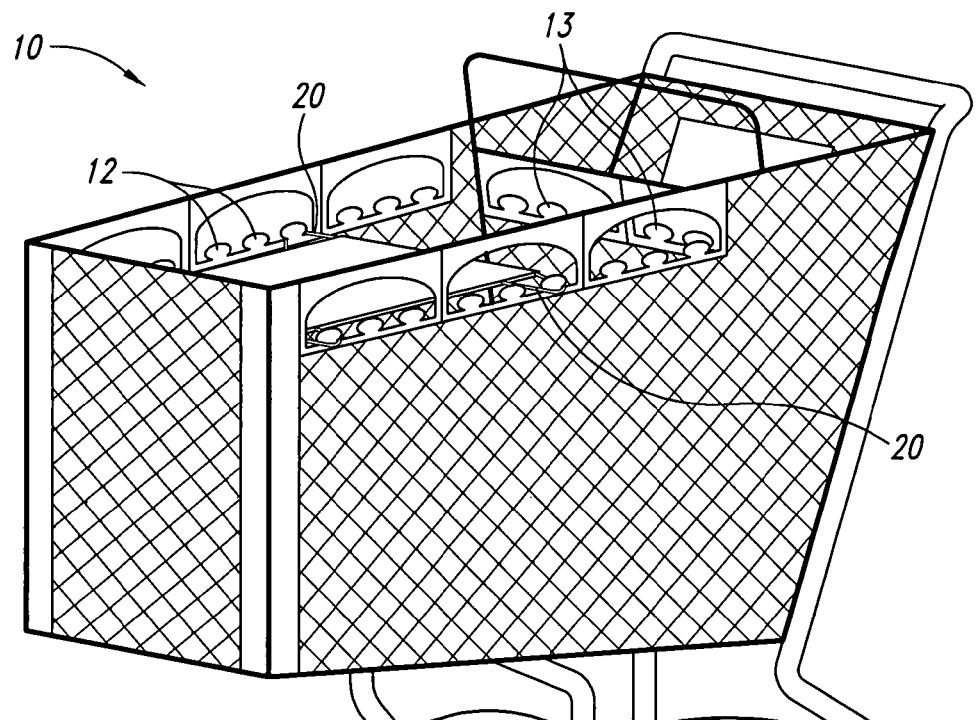
FIG. 5 is a perspective view an assembly including the shopping cart of FIG. 2, supporting a tray, which is an accessory and, in one preferred embodiment, may form a part of the invention.
Figure 6:
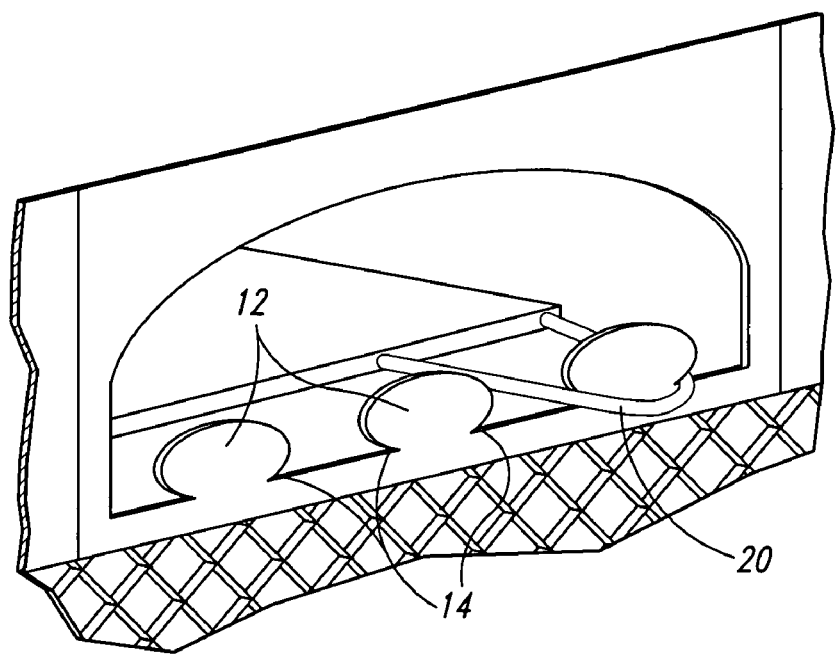
FIG. 6 is a detail view of the shopping cart/tray assembly of FIG. 5, showing how the tray is engaged to a bag hanger.
Figure 7:
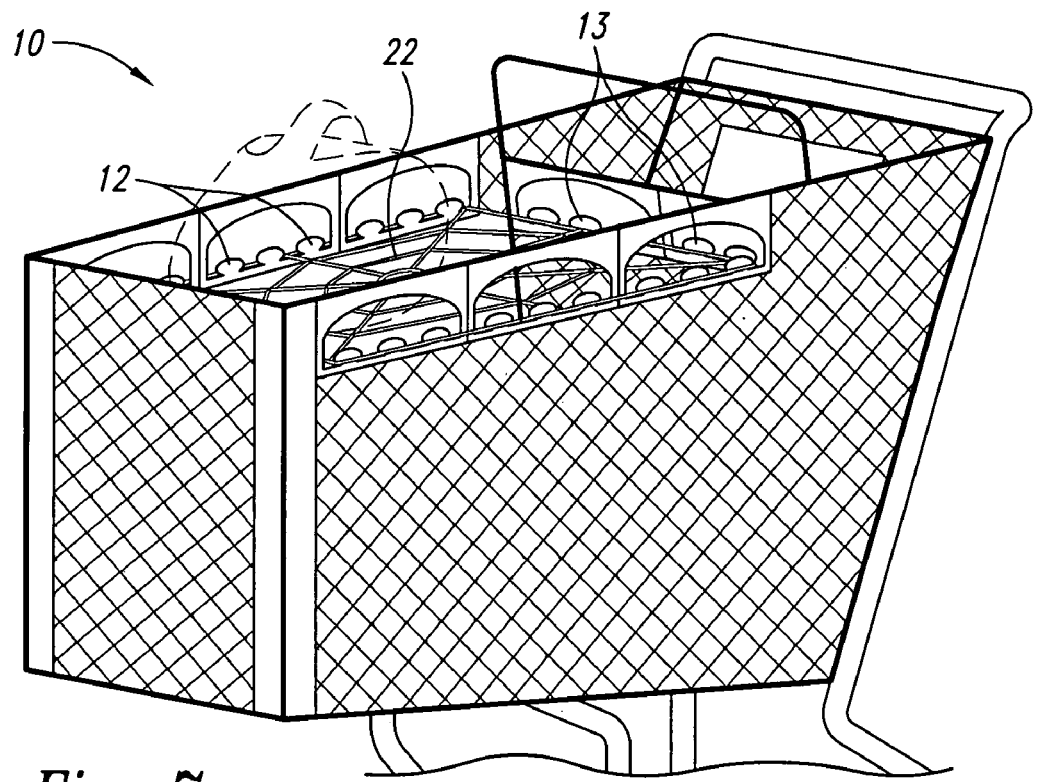
FIG. 7 is a perspective view of the shopping cart of FIG. 1, supporting a cargo net.

Referring to FIG. 4, a pull style personal shopping cart 18, may also be fitted with bag hangers 12. These are arranged at varying heights, as shown, to help a shopper hang bags of groceries so as to efficiently pack cart 18. Referring to FIGS. 5 and 6, bag hangers 12 may also be used to support and retain a tray, equipped with rigid side loops 20, over the basket portion of the cart. Side loops 20 engage with bag hangers 12 as shown in FIG. 6. This greatly facilitates the task of store employees who need a mobile work surface for their work evaluating inventory in a store. Referring to FIG. 7, a cargo net 22 may also be attached to hangers 12.

Additional accessories, such as a cup holder, wine rack or coupon organizer can be made so as to engage with bag hangers 10. These items could be kept near the front of the store and made available to increase the convenience of the shoppers. This would help a store to distinguish itself as being particularly concerned about and helpful to shoppers, in the bitterly competitive retail industry.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A set of shopping carts, each comprising a frame and a set of wheels, rotatably mounted on and supporting said frame, and a basket portion supported by said frame and including a grid-work bottom wall and set of side walls, including lateral side walls and front and rear side walls, said rear side wall including a gate, and:
   (a) wherein each said side wall defines a plane and a set of fixed bag hangers projecting upwardly and away from said plane, all on the same side of said plane, to facilitate the act of hanging a bag from said bag hanger, and wherein each said bag hanger defines a recess in said side wall on the side of the plane opposite said projections, said recess formed to accommodate a bag hanger from another cart when a first cart and a second cart from said set of carts are nested together; and
   (b) wherein said shopping carts are therefore interchangeably mutually nestable, without interference from said bag hangers.

2. The set of shopping carts of claim 1, wherein said fixed bag hangers project outwardly from said side walls.

3. The set of shopping carts of claim 1, wherein said fixed bag hangers project inwardly from said side walls.

4. The set of shopping carts of claim 1, including other fixed bag hangers that are aligned to a plane defined by a sidewall by which said bag hangers are supported and wherein said bag hangers are not substantially wider than said side wall, so that said bag hangers do not interfere with said nesting of said carts, thereby permitting any two of said shopping carts to be nested together.

5. The set of shopping carts of claim 1, wherein said side walls of said shopping cart are made of molded plastic.

6. The set of shopping carts of claim 1, wherein said side walls are made of metal framework.

7. The set of shopping carts of claim 1, comprising only two shopping carts.

8. The set of shopping carts of claim 1, wherein said gate defines bag hangers.

* * * * *